United States Patent
De Gaetano et al.

(10) Patent No.: US 11,995,215 B2
(45) Date of Patent: May 28, 2024

(54) VERIFICATION OF AUTHENTICITY OF DOCUMENTS BASED ON SEARCH OF SEGMENT SIGNATURES THEREOF

(71) Applicant: International Business Machines Corporation, Armonk, NY (US)

(72) Inventors: Rossella De Gaetano, Rome (IT); Vito Longo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 17/457,508

(22) Filed: Dec. 3, 2021

(65) Prior Publication Data

US 2023/0177216 A1 Jun. 8, 2023

(51) Int. Cl.
*G06F 21/64* (2013.01)
*G06F 16/93* (2019.01)
*G06F 21/60* (2013.01)

(52) U.S. Cl.
CPC .............. *G06F 21/64* (2013.01); *G06F 16/93* (2019.01); *G06F 21/602* (2013.01)

(58) Field of Classification Search
CPC ......... G06F 21/64; G06F 16/93; G06F 21/602
See application file for complete search history.

(56) References Cited

U.S. PATENT DOCUMENTS

| | | | |
|---|---|---|---|
| 7,814,078 B1* | 10/2010 | Forman | G06F 16/24554 |
| | | | 707/698 |
| 10,733,220 B2* | 8/2020 | Burchfield | G06F 16/93 |
| 10,776,399 B1* | 9/2020 | Rajpara | G06F 16/285 |
| 10,824,762 B2 | 11/2020 | Wilson | |
| 11,645,249 B1* | 5/2023 | Mahyar | G06V 20/46 |
| | | | 707/692 |
| 2011/0026763 A1* | 2/2011 | Diggins | H04H 60/58 |
| | | | 381/2 |

(Continued)

FOREIGN PATENT DOCUMENTS

| | | |
|---|---|---|
| CN | 104239753 B | 5/2017 |
| KR | 20200045657 A | 5/2020 |
| WO | 2021011333 A1 | 1/2021 |

OTHER PUBLICATIONS

Acheampong, et al., "Text-based emotion detection: Advances, challenges, and opportunities", Engineering Reports, 2020; 2:e12189, 24 pages, <https://onlinelibrary.wiley.com/doi/full/10.1002/eng2.12189>.

(Continued)

*Primary Examiner* — Lynn D Feild
*Assistant Examiner* — Ethan V Vo
(74) *Attorney, Agent, or Firm* — Joseph P. Curcuru

(57) ABSTRACT

A solution is proposed for verifying authenticity of documents. A corresponding method comprises calculating signatures representative of segments splitting a current document. The signatures are searched in an authoritative memory structure containing corresponding signatures of (Continued)

segments splitting authoritative documents whose content is certified by authoritative sources. Authenticity information of the current document is determined according to a result of this search. A computer program and a computer program product for performing the method are also proposed. Moreover, a system for implementing the method is proposed.

20 Claims, 7 Drawing Sheets

(56) References Cited

U.S. PATENT DOCUMENTS

| | | | | |
|---|---|---|---|---|
| 2012/0246185 | A1* | 9/2012 | Morimoto | G06Q 50/10 707/E17.014 |
| 2014/0082183 | A1 | 3/2014 | Doan | |
| 2014/0372076 | A1* | 12/2014 | Radhakrishnan | G06F 40/30 702/179 |
| 2016/0055196 | A1* | 2/2016 | Collins | G06F 16/93 707/690 |
| 2017/0109326 | A1* | 4/2017 | Tan | G09B 7/02 |
| 2017/0195125 | A1 | 7/2017 | Heppe | |
| 2018/0203916 | A1* | 7/2018 | Rafsky | G06F 16/285 |
| 2019/0130190 | A1* | 5/2019 | Raspotnik, Jr. | H04L 9/32 |
| 2019/0158274 | A1* | 5/2019 | Tormasov | H04L 9/3297 |
| 2019/0188322 | A1* | 6/2019 | Krishna | G06F 16/951 |
| 2019/0251648 | A1* | 8/2019 | Liu | G06Q 50/184 |
| 2020/0193153 | A1* | 6/2020 | Lee | G06F 40/226 |
| 2021/0004582 | A1* | 1/2021 | Evans | G06F 16/9014 |
| 2021/0326461 | A1* | 10/2021 | Paul | H04L 63/1425 |
| 2021/0344498 | A1* | 11/2021 | Perunov | H04L 63/08 |
| 2023/0231725 | A1* | 7/2023 | Ammar | H04L 9/3247 713/176 |

OTHER PUBLICATIONS

Aldwairi, et al., "Detecting Fake News in Social Media Networks", Procedia Computer Science, vol. 141, 2018, pp. 215-222, <https://www.sciencedirect.com/science/article/pii/S1877050918318210>.

Amoruso, et al., "A Web Infrastructure for Certifying Multimedia News Content for Fake News Defense", arXiv:2104.04671v1, Submitted on Apr. 10, 2021, 7 pages, <https://arxiv.org/abs/2104.04671>.

Gupta, Sanket, "Overview of Text Similarity Metrics in Python", Towards Data Science, May 15, 2018, 7 pages, <https://towardsdatascience.com/overview-of-text-similarity-metrics-3397c4601f50>.

Huckle, et al., "Fake News—a Technological Approach to Proving the Origins of Content, Using Blockchains", Big Data 5(4):356-371, Dec. 2017, 44 pages, <https://www.researchgate.net/publication/321790598_Fake_News_A_Technological_Approach_to_Proving_the_Origins_of_Content_Using_Blockchains>.

Salakhutdinov, et al., "Semantic hashing", International Journal of Approximate Reasoning, vol. 50, Issue 7, Jul. 2009, pp. 969-978, <https://www.sciencedirect.com/science/article/pii/S0888613X08001813>.

Zhang, et al., "Fakedetector: Effective Fake News Detection with Deep Diffusive Neural Network", arXiv:1805.08751v2, Aug. 10, 2019, 13 pages, <https://arxiv.org/pdf/1805.08751.pdf>.

\* cited by examiner

VERIFICATION OF AUTHENTICITY OF DOCUMENTS BASED ON SEARCH OF SEGMENT SIGNATURES THEREOF

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to verification of authenticity of documents.

Verification of authenticity of documents is of outmost importance in several situations. In fact, verification of authenticity ensures that the documents are true and that the contents of the document may be trusted. For example, this is the case when it has been proven that the documents originate from authoritative sources being generally deemed reliable. A typical situation where it is important to verify the authenticity of documents is when the documents relate to news regarding current events. In this context, false or misleading information (known as fake news) is commonplace. Fake news has become a main issue in recent years due the large circulation and diffusion of social networks. In fact, fake news injected into social networks may easily become viral, as users of the social networks forward them to other users thereof. Misleading or false information is very dangerous, since it may be used to manipulate public opinion (e.g., politics, health care, and investments) by spreading disinformation deliberately to deceive the public opinion.

Several precautions may be put into practice to detect fake news. Particularly, it is recommended to verify whether the corresponding sources are reliable (real and credible). However, fake news very often contains the same format of real articles provided by official sources. Therefore, it is quite difficult (if not impossible) for individuals to recognize fake news. Services are available (such as in the Internet) for facilitating the identification of fake news. For example, debunking services help persons (i.e., users) to discredit opinions provided by fake news and fact-checking services help users verify the veracity of news. However, the use of these services is time consuming, and in many cases requires that doubts about the veracity of the documents have already been raised by the users employing the services independently. Feedback mechanisms may also be implemented to allow persons to comment or score documents. However, the comments/scores themselves should be verified, which often requires a pre-screening by moderators to prevent abuses. Thus, the feedback mechanism approach is very tedious.

To facilitate the recognition of fake news, automatic tools have been proposed. Particularly, these automatic tools apply different techniques (e.g., based on artificial intelligence) to analyze sentences, images and videos of each document. For example, the automatic tools are used to detect inconsistencies in a context of the document, or to cross-reference the questioned misleading information or documents (the documents) with other documents relating to the same topic; moreover, the automatic tools may be used to detect and analyze reactions of persons to the documents (such as time spent to read them, correlated searches being performed and so on). However, the above-mentioned techniques are computationally expensive; moreover, the obtained results may be unsatisfactory (especially as the fake news becomes more sophisticated).

Alternatively, hashes are calculated for portions of each document (such as sentences, images and bibliographic data), wherein hashes are signed digitally with a private key of the source of the document, and wherein these additional pieces of information (or links thereto in a public manifest of the document being signed digitally with the private key of its source as well) are then embedded in the document proximate to the corresponding portions thereof. Whenever one or more portions of the document is reported in another document, the one or more portions of the document are accompanied by a digital signature that may be used to verify said document. However, this does not provide information regarding the reliability and/or veracity of the sources of the documents.

Signatures of portions of documents are also used in different applications. For example, signatures in the forms of checksums or hashes may be used to verify integrity of documents. In this case, the signatures of (overlapping) bubbles (e.g., signature areas) are calculated of a back-up of a document in an original version thereof. In order to verify the integrity of any other new version of this document, the signatures of the same bubbles are calculated for the new version of the document and they are compared with the signatures of the bubbles of the original version of the document. Any regions of the new version of the document within the bubbles whose signatures in the new version of the document do not match the signatures of the corresponding bubbles in the original version of the document (i.e., no intersecting bubbles whose signatures in the new version of the document match the signatures of the corresponding bubbles in the original version of the document) are identified as suspected. This allows restoring the original version of the suspected regions of the new version of the document from the corresponding regions of the original version of the document with high granularity.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of searching segment signatures in authoritative documents.

Particularly, an embodiment provides a computer-implemented method for verifying authenticity of documents. The computer-implemented method comprises calculating signatures representative of segments splitting a current document. The signatures are searched in an authoritative memory structure containing corresponding signatures of segments splitting authoritative documents whose content is certified by authoritative sources. Authenticity information of the current document is determined according to a result of this search.

A further aspect provides a computer program for implementing the method.

A further aspect provides a corresponding computer program product.

A further aspect provides a system for implementing the method.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

Particularly.

DETAILED DESCRIPTION

With reference now to FIG. 1A-FIG. 1D, the general principles are shown of the solution according to an embodiment of the present disclosure.

Figure 1A:
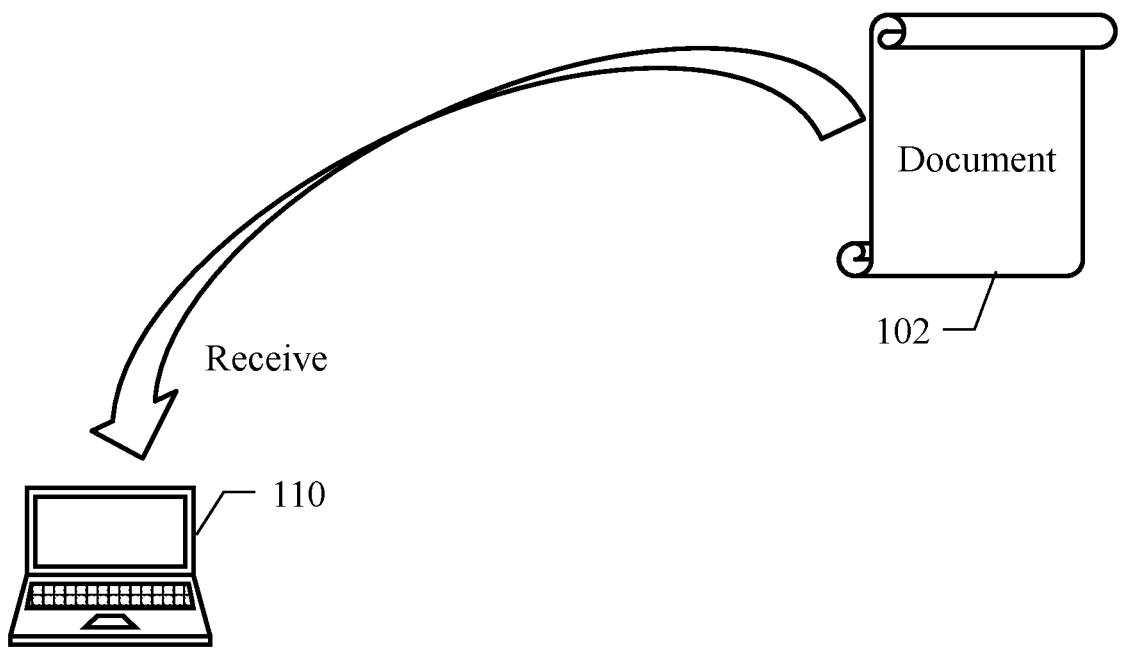
FIG. 1A-FIG. 1D show the general principles of the solution according to an embodiment of the present disclosure.

Starting from FIG. 1A, documents (document(s) 102) may be verified for their authenticity (i.e., examined and identified as creditable). In various embodiment document(s) 102 is one or more documents defined herein. In general, document(s) 102 are (digital) computer-readable artifacts (for example, web pages) providing a representation of thought (for example, in the form of text, images and/or videos relating to any topic, such as news, politics, health care, and investments). For this purpose, a (current) document (e.g., document 102) is received (for example, by downloading it from the Internet, such as in a social network providing publishing, instant-messages, chat, blogs, video blogs, opinions, and/or forum) by computing device 110.

Figure 1B:
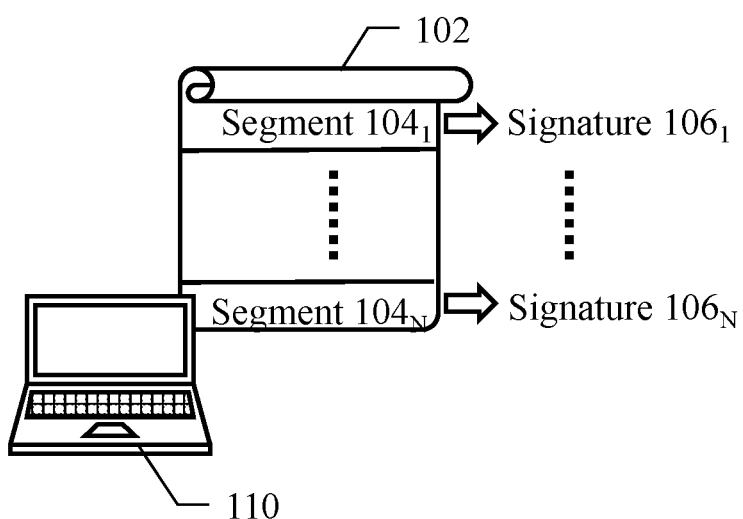

Moving to FIG. 1B, in the solution according to an embodiment of the present disclosure the current document (e.g., document 102) is split into a plurality of (current) segments $104_1$-$104_N$, collectively referred to as segment(s) 104, wherein N represents a positive integer, and accordingly the number of scenarios implemented in a given embodiment of the present invention is not limited to those depicted in FIG. 1B. For example, the current segments are defined by corresponding paragraphs, images and/or videos of the current document. Corresponding (current) segment signatures $106_1$-$106_N$, collectively referred to as segment signature(s) 106, of the current segments are then calculated, wherein N represents a positive integer, and accordingly the number of scenarios implemented in a given embodiment of the present invention is not limited to those depicted in FIG. 1B. The current segment signature(s) 106 are values representative of the current segments, which are derived from their contents (for example, hash values thereof).

Figure 1C:
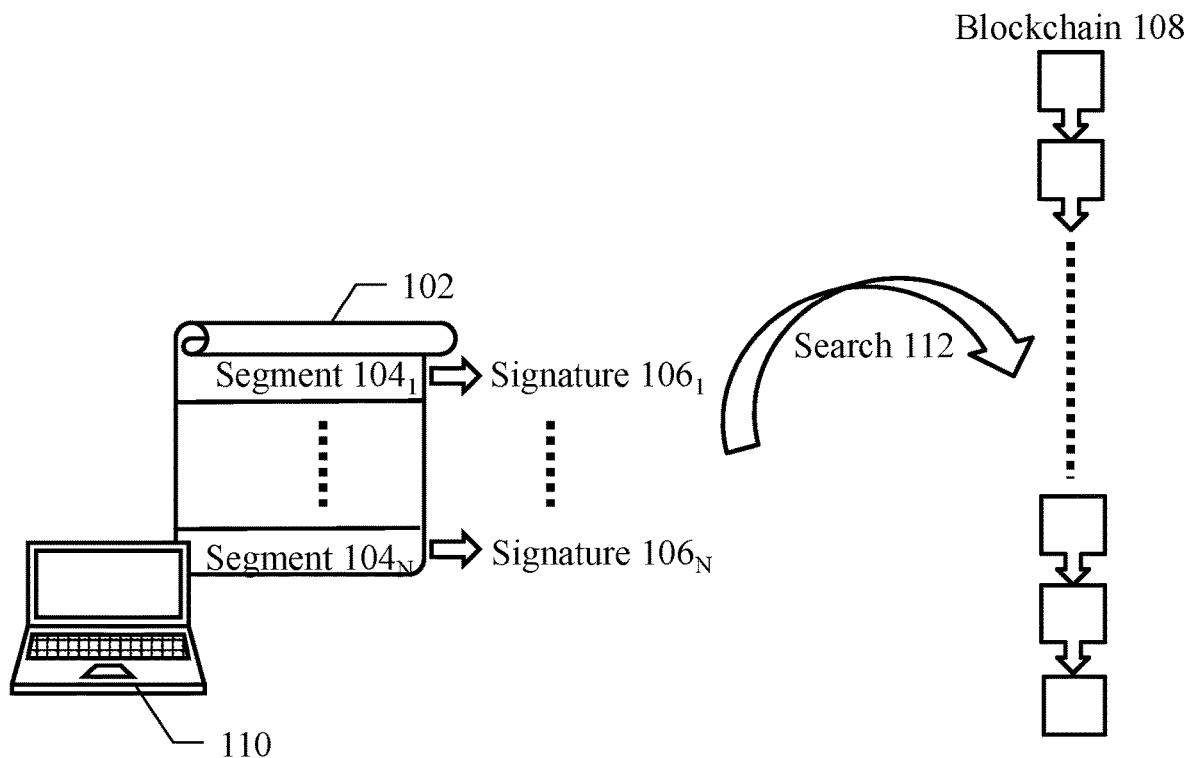

Moving to FIG. 1C, a segment(s) 104 search is performed in an authoritative memory structure, for example, a blockchain (i.e., blockchain 108). Blockchain 108 contains information relating to (authoritative) documents whose content is certified by (authoritative) sources. The authoritative sources are entities being generally trusted (for example, public organizations, large newspapers publishers, official news providers, and/or academic/scientific institutions); the authoritative sources are then generally respected as providing complete and accurate information (for example, implementing corresponding verification procedures for news, such as based on the five or six Ws principles). The five or six Ws are questions whose answers are considered basic in information-gathering, wherein the six Ws include Who, What, When Where, Why, and How. For each authoritative document, the blockchain contains similar (authoritative) signatures of (authoritative) segments of the authoritative document (i.e., signature(s) 106). The segment search (i.e., search 112) is aimed at finding the authoritative documents whose authoritative segment signatures contain the current segment signatures of the current document (i.e., signature(s) 106).

Figure 1D:
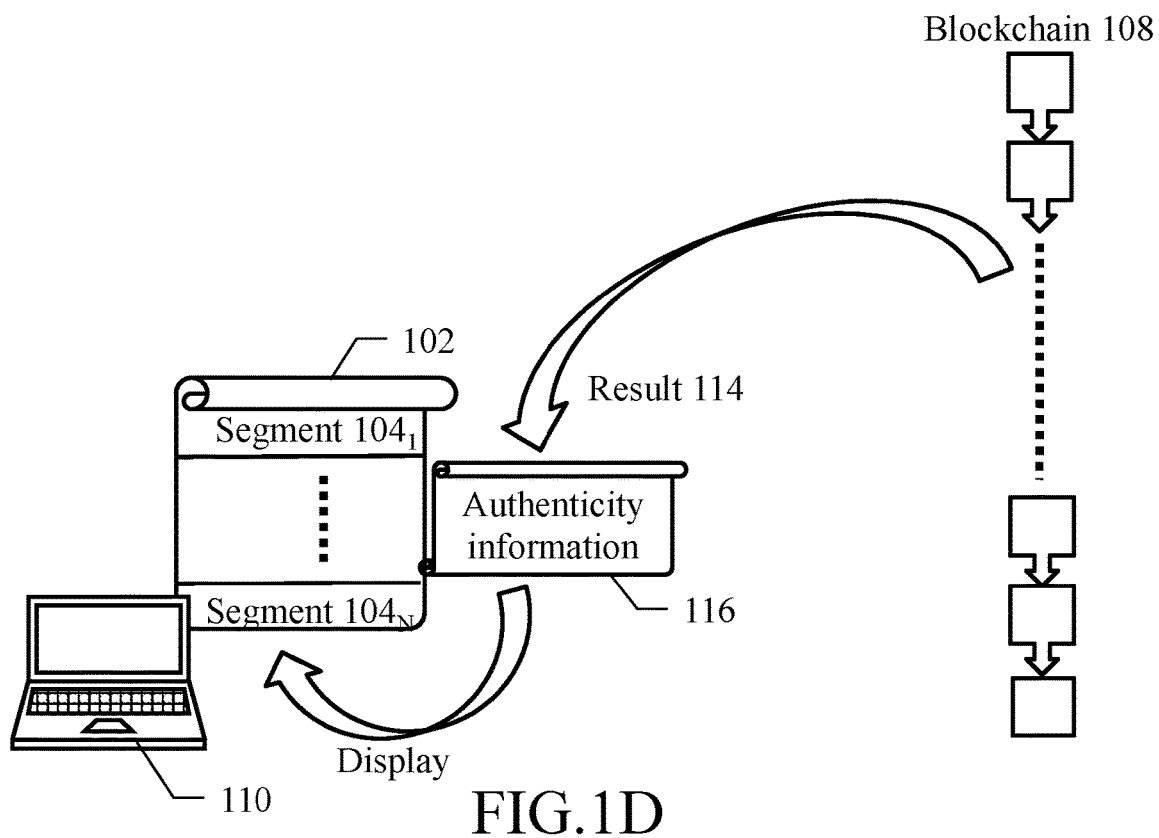

Moving to FIG. 1D, authenticity information 116 is determined according to a result of the segment search (i.e., result 114). Result 114 are the one or more results generated and/or retrieved from search 112 that comprise authenticity information 116. Authenticity information 116 is indicative of authenticity of a content of the current document (for example, indicating whether the current document is equal to an authoritative document, is a rearrangement of an authoritative document, is a limitation of an authoritative document, is a mixture of multiple authoritative documents or is a manipulation of an authoritative document). An indication of the authenticity information is then output to computing device 110 (for example, displayed, via a user interface on computing device 110, in association with the current document).

The above-mentioned solution significantly facilitates the verification of the authenticity of documents. In fact, in this way it is possible to recognize (in a very accurate way) whether and how the contents of documents originate from authoritative documents (and then they may be trusted) or to which extent corresponding authoritative documents have been manipulated.

This result is achieved automatically in a simple way, so that it does not have any significant impact on performance; moreover, the result is achieved without requiring any modification of the documents, so that it is of general applicability.

Particularly, the above-mentioned solution facilitates the recognition of fake news. This has a beneficial effect on the spread of fake news (especially over social networks), thereby reducing the risks of manipulation of the public opinion.

Moreover, the same solution may also be used to detect copyright violations of the authoritative documents.

Figure 2:
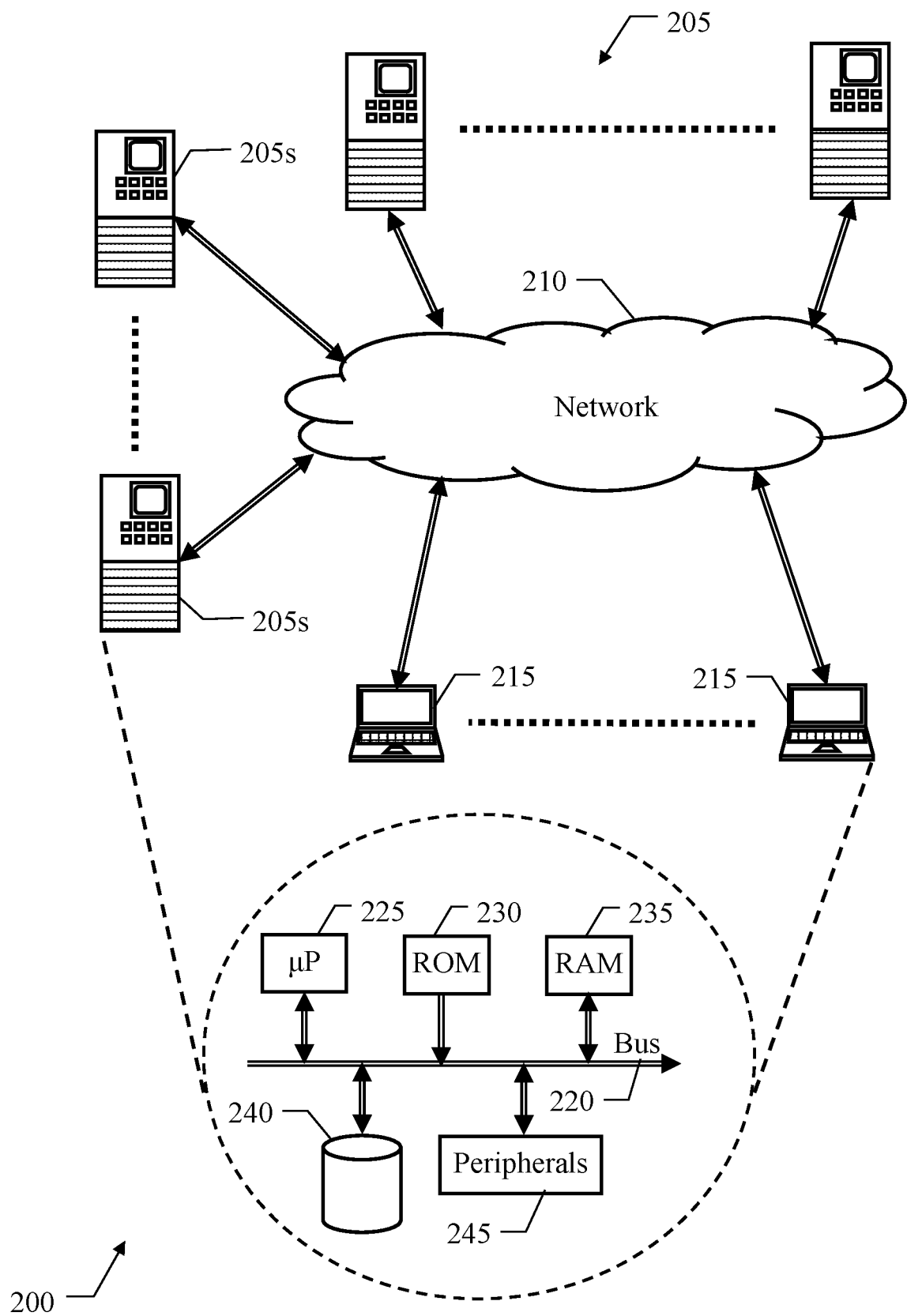
FIG. 2 shows a schematic block diagram of an information technology infrastructure that may be used to implement the solution according to an embodiment of the present disclosure.

With reference now to FIG. 2, a schematic block diagram is shown of an information technology infrastructure 200 that may be used to implement the solution according to an embodiment of the present disclosure.

The information technology infrastructure 200 has a distributed architecture, typically based on the Internet; the Internet is formed by millions of server computing systems, or simply servers 205, which are connected among them through a (telecommunication) network 210 of global type. A subset of the servers 205, known as World Wide Web or simply web, allows accessing corresponding web sites comprising collections of web pages that are defined by hyper-text documents connected among them via hyper-links. Users of client computing systems, or simply clients 215 access the Internet to exploit services offered by the servers 205, and particularly to download selected web pages. Some of the servers 205, differentiated as source servers 205s, are used by the authoritative sources to publish their authoritative documents and to manage the blockchain accordingly. Clients 215 are computing devices as they are defined herewith and/or as they are known and understood in the art.

Each of the above-mentioned computing systems (i.e., servers 205 and clients 215) comprises several units that are connected among them through a bus structure 220 at one or more levels (with an architecture that is suitably scaled according to the type of the computing system (i.e., servers 205 and clients 215). Particularly, a microprocessor (µP) 225, or more, provides a logic capability of the computing system (i.e., servers 205 and clients 215); a non-volatile memory (ROM) 230 stores basic code for a bootstrap of the computing system (i.e., servers 205 and clients 215) and a volatile memory (RAM) 235 is used as a working memory by the microprocessor 225. The computing system (i.e., servers 205 and clients 215) is provided with a mass-memory 240 for storing programs and data, for example, storage devices of a data center wherein each server 205 is implemented or a Solid-State Disk (SSD) for each client 215. Moreover, the computing system (i.e., servers 205 and clients 215) comprises a number of controllers for peripherals, or Input/Output (I/O) units, 245; for example, as far as relevant to the present disclosure the peripherals 245 of each server 205 comprise a network adapter for plugging the server 205 into the corresponding data center and then connecting it to a console of the data center for its control (for example, a personal computer, also provided with a drive for reading/writing removable storage units, such as of USB type) and to a switch/router sub-system of the data center for its communication with the network 210, whereas the peripherals 245 of each client 215 comprise a keyboard, a mouse, a monitor, a network adapter for connecting to the network 210 and a drive for reading/writing removable storage units (such as of USB type).

Figure 3:
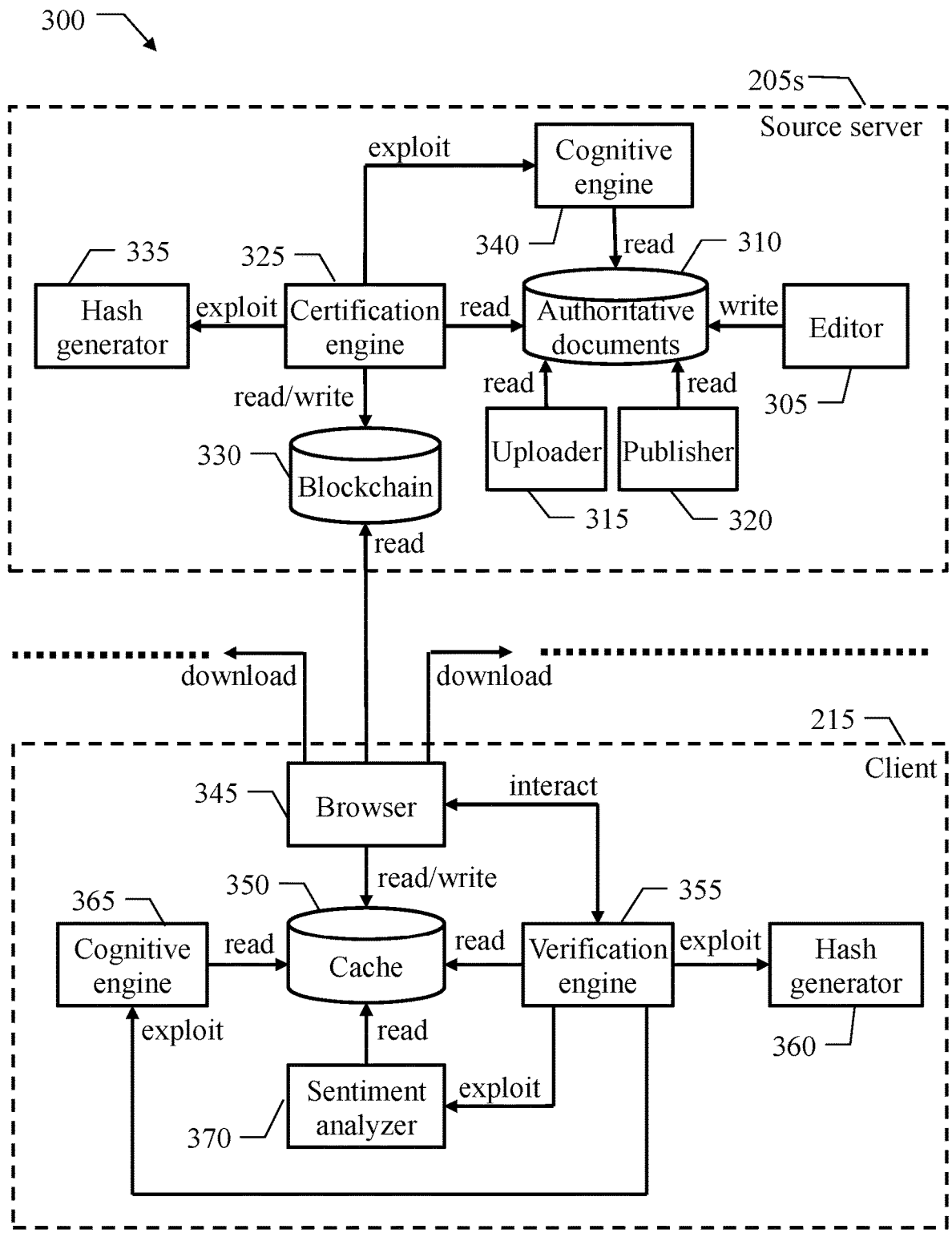
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300 (i.e., software components 300. The software components 300 are typically stored in the mass memory and loaded (at least partially) into the working memory of the relevant computing systems (source servers 250s and clients 215) when the programs are running, together with an operating system and other application programs not directly relevant to the solution of the present disclosure (thus omitted in the figure for the sake of simplicity). The programs are initially installed into the mass memory, for example, from removable storage units or from the Internet. In this respect, each program may be a module, segment or portion of code, which comprises one or more executable instructions for implementing the specified logical function.

Starting from the source server 205s of each authoritative source (only one shown in the figure), it comprises the following components.

An editor 305 is used by one or more authors of the authoritative source to edit the corresponding authoritative documents. For this purpose, the editor 305 implements one or more functionalities depending on possible formats of the contents of the authoritative documents (such word processor for texts, graphics editor for images, video editor for videos, HTML editor for web pages and so on). The editor 305 writes an authoritative documents repository 310, which contains the authoritative documents originating from the authoritative source. The authoritative documents repository 310 has an entry for each authoritative document; the entry stores the authoritative document (with possible bibliographic information, such as date, authors and so). An uploader 315 uploads the authoritative documents to an authoritative datastore (for example, a Cloud Object Storage (COS) bucket), not shown in the figure; the authoritative datastore stores all the authoritative documents (being certified by the different authoritative sources) that are currently published; the authoritative datastore may be accessed for reading publicly, whereas it may be accessed for writing only by the source servers 205s. The uploader 315 reads the authoritative documents repository 310. A publisher 320 publishes the authoritative documents for their downloading by the clients 215 (for example, publicly or only for users being registered with the authoritative source). The publisher 320 reads the authoritative documents repository 310.

In the solution according to an embodiment of the present disclosure, a certification engine 325 certifies the authoritative documents. For this purpose, the certification engine 325 controls the addition of information to a blockchain (i.e., blockchain 108) (used to verify the authenticity of documents by the clients 215). In general, a blockchain (i.e., blockchain 108) is a distributed ledger that stores information (in the form of transactions). The transactions are stored into a sequence of blocks in chronological order; the blocks are linked to each other via corresponding hash values so as to make more and more computational difficult to alter a block as the number of further blocks following it in the blockchain increases. The blockchain is distributed in a peer-to-peer network of nodes, which nodes validate its content according to a consensus schema that determines the actual valid version of the blockchain (with no centralized version of the blockchain that exists and no node that is more trusted than any other node is). The blockchain (thanks to its collaborative approach) provides scalability, reliability and high performance. In the context of the present disclosure, the transactions stored in the blockchain relate to the authoritative documents.

Particularly, each transaction contains a link to the corresponding authoritative document, a name of its authoritative source, an authoritative document signature of the whole authoritative document, corresponding links to authoritative segments splitting the authoritative document, corresponding authoritative segment signatures of the authoritative segments, a list of authoritative feature labels of the authoritative document and an authoritative feature signature of the list of authoritative feature labels. In the example at issue, the link to the authoritative document points thereto in the authoritative datastore, whereas the links to the authoritative segments point to the positions of the corresponding authoritative segments within the authoritative document. The authoritative document/segment/feature signatures are hash values of the corresponding pieces of information. The authoritative features labels are indicative of corresponding key features of the authoritative document, being important to characterize its content (for example, concepts, dates, locations, proper names and so on). The blockchain is permissioned (or private), wherein only the authoritative sources may act as validators being authorized to write the blockchain by adding transactions thereto; for this purpose, the authoritative sources are vetted by a control authority (for example, a government agency), which guarantees their authority.

The certification engine 325 reads the authoritative documents repository 310 and it reads/writes a blockchain repository 330, which stores a version of the blockchain that is currently known to the source server 205s. The certification engine 325 exploits a hash generator 335, which generates the hash values required to create the authoritative document/segment/feature signatures and to add transactions to the blockchain repository 330; particularly, the hash generator 335 maps each piece of information of any arbitrary size onto a hash value of fixed size, with a low risk of obtaining the same hash value from different pieces of information. The certification engine 325 exploits a cognitive engine 340. The cognitive engine 340 applies cognitive techniques to extract the corresponding authoritative feature labels from the authoritative documents. Generally speaking, cognitive techniques mimic the functioning of the human brain for interpreting a meaning of raw and unstructured information (for example, by applying natural language processing, image recognition and machine learning techniques). The cognitive engine 340 reads the authoritative documents repository 310.

Moving to the client 215 of each user (only one shown in the figure) it comprises the following documents.

A (web) browser 345 is used to navigate (or surf) on the Internet. Particularly, as far as relevant to the present disclosure, the browser 345 is used to download current documents from whatever (web) servers of the Internet (not shown in the figure) and to read the blockchain in the blockchain repository 330 of whatever source servers 205s. The browser 345 read/writes a cache memory 350. The cache memory 350 stores the information downloaded from the Internet temporarily; as far as relevant to the present disclosure, the cache memory 350 contains the current documents whose authenticity has to be verified and possible authoritative documents corresponding thereto.

In the solution according to an embodiment of the present disclosure, the browser 345 interacts with a verification engine 355 (for example, implemented by a corresponding plug-in), which verifies the authenticity of the current documents. The verification engine 355 reads the cache memory 350. The verification engine 355 exploits a hash generator 360; for each current document, the hash generator 360 generates a current document signature of the whole current document, corresponding current segment signatures of current segments splitting the current document, and a current feature signature of current feature labels of the current document as above. The verification engine 355 exploits a cognitive engine 365. The cognitive engine 365 applies cognitive techniques to extract corresponding current feature labels from the current documents (indicative of corresponding key features thereof) as above. The cognitive engine 365 reads the cache memory 350. The verification engine 355 exploits a sentiment analyzer 370. The sentiment analyzer 370 applies sentiment analysis techniques to extract corresponding current/authoritative sentiment indicators of sentiments expressed in the current/authoritative documents (or parts thereof). Sentiment analysis is aimed at interpreting a sentiment of raw and unstructured information (for example, by applying natural language processing, image recognition and machine learning techniques); the sentiment is indicative of a physiological state with respect to the information, for example, objective/subjective, polarity (such as positive, negative or neutral), beyond polarity (such as enjoyment, anger, disgust, sadness, fear or surprise) and so on. The sentiment analyzer 370 reads the cache memory 350.

Figure 4:
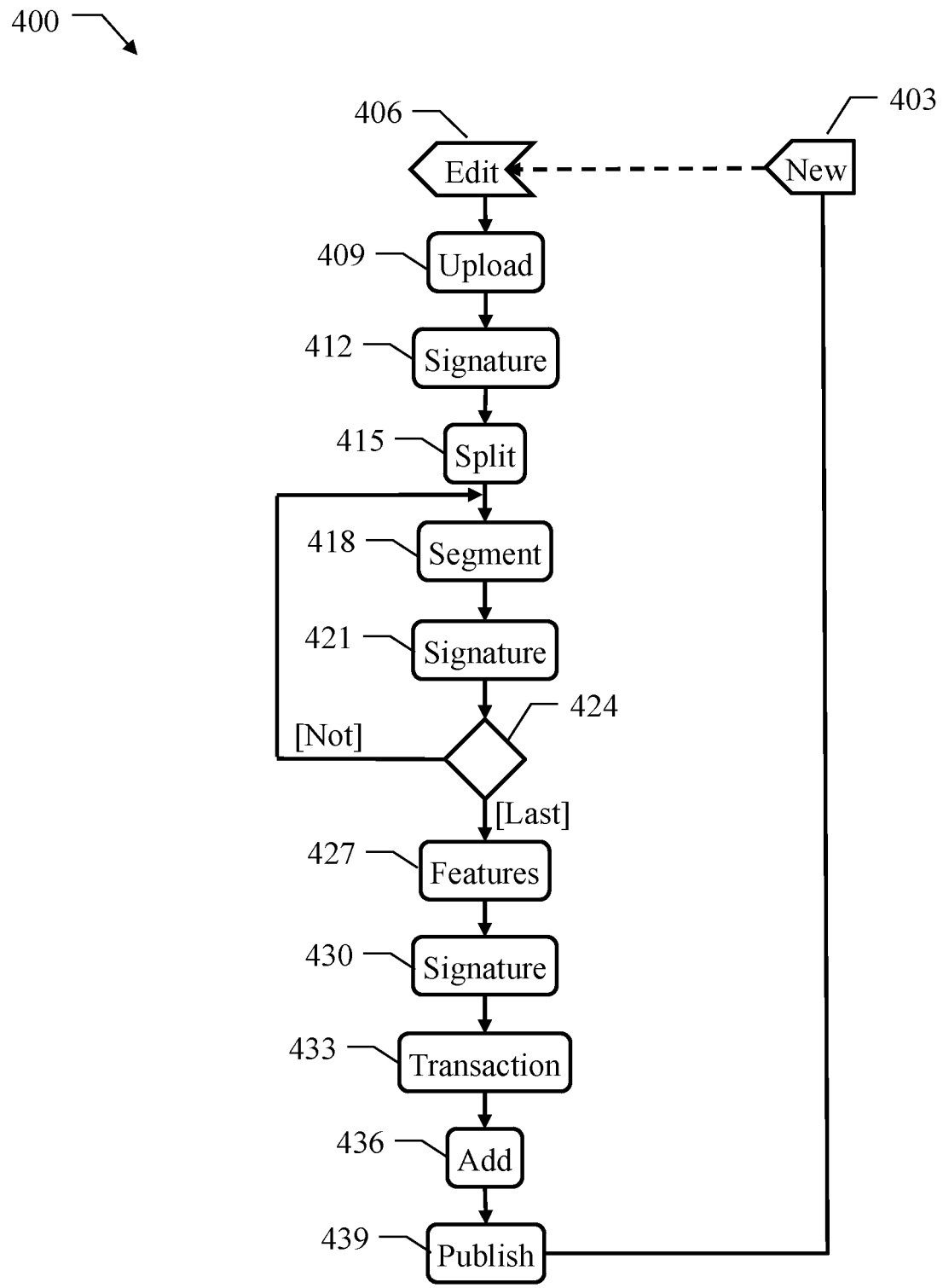
FIG. 4 illustrates operational steps of an implementation of the solution, on a server computer, for certifying the authenticity of documents, in accordance with an embodiment of the present invention.
Figure 5A:
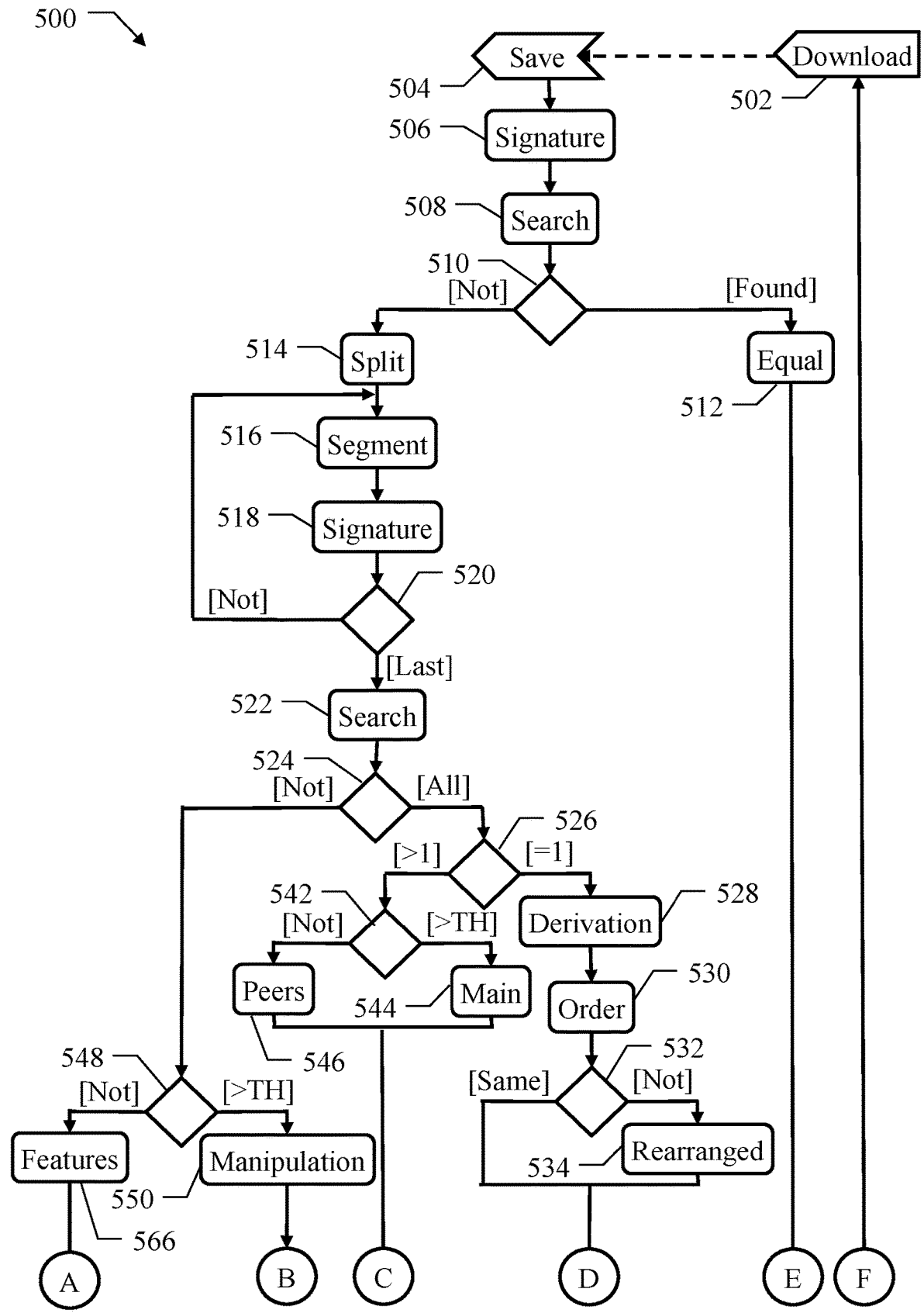
FIG. 5A-FIG. 5B show different activity diagrams describing the flow of activities relating to an implementation of the solution according to an embodiment of the present disclosure.
Figure 5B:
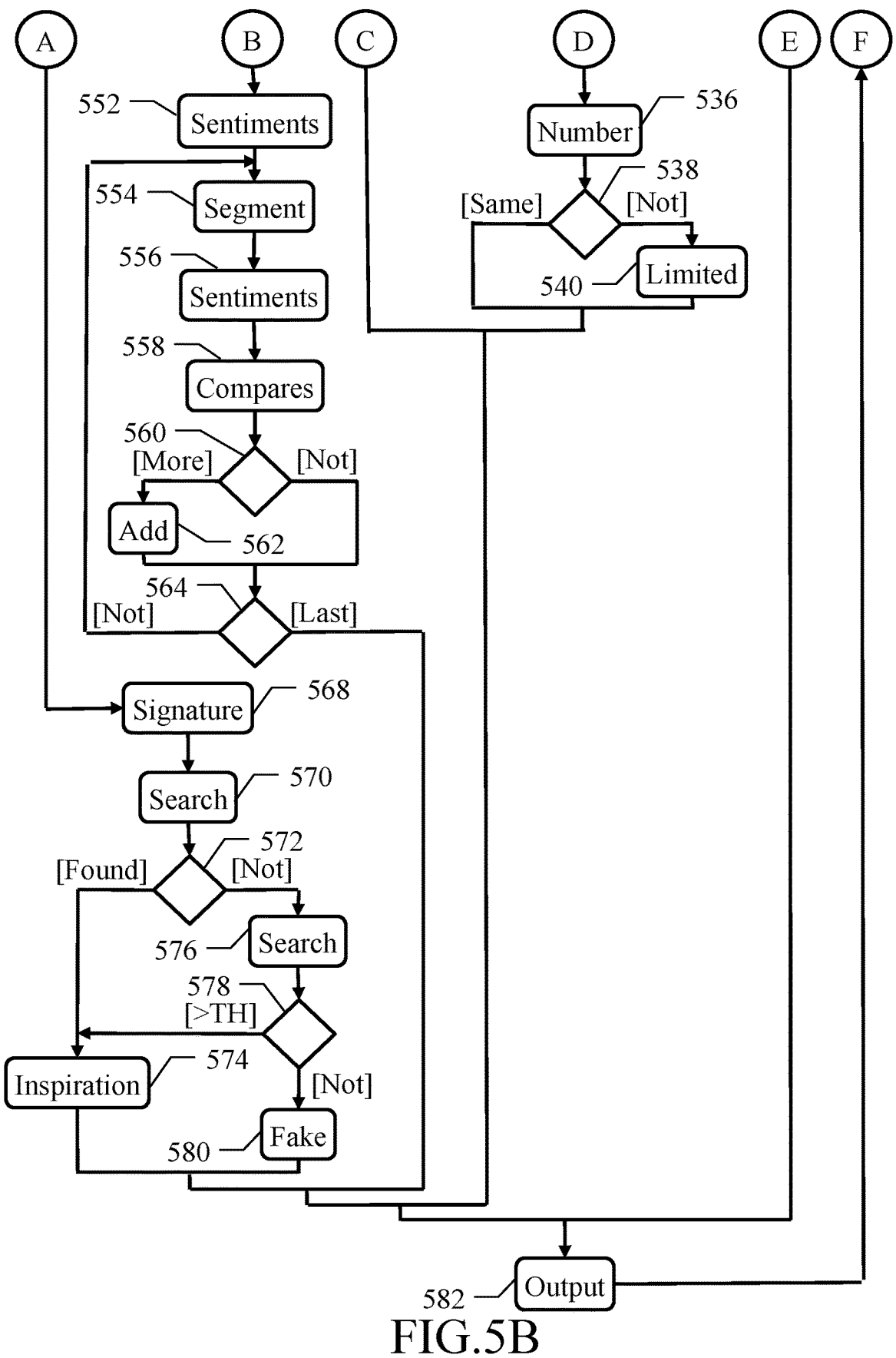

With reference now to FIG. 4, FIG. 5A, and FIG. 5B, different activity diagrams are shown describing the flow of activities relating to an implementation of the solution according to an embodiment of the present disclosure. In this respect, each block may correspond to one or more executable instructions for implementing the specified logical function by the corresponding computing systems (source servers and clients).

Starting from FIG. 4, the activity diagram represents an exemplary process for certifying the authenticity of documents with a method 400 on the source server of a generic authoritative source. The process passes from block 403 to block 406 whenever a new authoritative document is published by the authoritative source (either a fresh authoritative document being published for the first time or an updated authoritative document replacing a previous version thereof). For this purpose, one or more authors of the authoritative source use the editor to create or update the (new) authoritative document. Once the authoritative document has been completed, the uploader at block 409 uploads it to the authoritative datastore (after authenticating the authoritative source thereto). The certification engine then certifies the authenticity of the authoritative document. For this purpose, the certification engine at block 412 commands the hash generator to generate the hash value of the whole authoritative document defining its authoritative document signature. For example, when the authoritative document will be published as a file the hash value is calculated from its binary representation, whereas when the authoritative document will be published embedded in a web page the hash value is calculated from its content with any text thereof converted into a standard format (such as flat text, HTML, MarkDown (MD) and so on).

The certification engine at block 415 splits the authoritative document into its authoritative segments. For example, the authoritative segments are defined by any multimedia contents of the authoritative document (such as images, videos and so on) and by any text portions of the authoritative document being isolated within it (such as sentences defined by periods, paragraph defined by indentations and/or white lines, chapters defined by titles and so on). A loop is then entered for generating the authoritative segment signatures. The loop begins at block 418, wherein the certification engine takes a (present) authoritative segment into account (starting from a first one in any arbitrary order). The certification engine at block 421 commands the hash generator to generate the hash value of the authoritative segment defining its authoritative segment signature. For this purpose, the certification engine extracts a definition of the authoritative segment from the authoritative document and passes it to the hash engine; for example, when the authoritative segment is a multimedia content the definition thereof is provided by its binary representation, whereas when the authoritative segment is a text portion the definition thereof is provided by its conversion into the standard format. The certification engine at block 424 verifies whether a last authoritative segment has been processed. If not, the flow of activity returns to block 418 to repeat the same operations on a next authoritative segment. Conversely (once all the authoritative segments have been processed), the loop is exited by descending into block 427. At this point, the certification engine commands the cognitive engine to extract the authoritative feature labels from the authoritative document.

The certification engine at block 430 commands the hash generator to generate the hash value of a list of the feature labels so obtained defining its authoritative feature signature. The certification engine at block 433 creates a new transaction to be added to the blockchain (containing a link to the authoritative document in the authoritative datastore, the name of the authoritative source, the authority document signature, the links to the authoritative segments within the authoritative document, the authoritative feature labels and the authoritative feature signature). The certification engine at block 436 distributes the transaction into the network, together with an indication of whether the authoritative document is fresh (i.e., new, wherein a new document is published or distributed within a predetermined timeframe) or an update of a previous version thereof indicated by the corresponding transaction in the blockchain (for example, by digitally signing the transaction with a private key of the authoritative source to certify its origin). Each source server receiving the transaction validates it. For this purpose, the source server verifies whether the transaction originates from an authoritative source (via its digital signature) and contains all the required pieces of information; moreover, if the transaction relates to an updated authoritative document, the source server further verifies whether the previous version of the authoritative document exists and whether it has been published by the same authoritative source (from the corresponding transaction in the blockchain). Once the transaction has been approved as valid by a predefined percentage of the source servers (for example, 70-100%), the transaction is added to the blockchain (by a first one of the source servers solving a corresponding mathematical puzzle and then distributing the new version of the blockchain into the network to the other source servers). In response thereto, the publisher at block 439 publishes the authoritative document (for example, in a corresponding web site). The flow of activity then returns to block 403 waiting for a further authoritative document to be published.

Moving to FIG. 5A-FIG. 5B, the activity diagram represents an exemplary process for verifying authenticity of documents with a method 500 on the client of a generic user. The process passes from block 502 to block 504 whenever the user downloads a new current document (for example, embedded in a web page, as a separate file and so on). In response thereto, the browser saves the (new) current document into the cache memory. The verification engine then verifies the authenticity of the current document. For this purpose, the verification engine at block 506 commands the hash generator to generate the hash value of the whole current document defining its current document signature as above; for example, when the current document is a file the hash value is calculated from its binary representation, whereas when the current document is embedded in a web page its content is extracted from the web page (by disregarding any superfluous content thereof, such as banners and advertisements), any text is converted into the standard format and the hash value is calculated from the obtained result. The verification engine at block 508 searches (via the browser) the current document signature in the blockchain; the search is performed moving backwards from an end of blockchain (in reverse chronological order so as to consider only the last version of each updated authoritative document) until the current document signature has been found or a start of the blockchain has been reached. The flow of activity branches at block 510 according to a result of this (document) search. If a transaction is found relating to a (matching) authoritative document having its authoritative document signature equal to the current document signature block 512 is executed, whereas if the current document signature has not been found in the blockchain blocks 514-580 are executed; in both cases, the flow of activity merges again at block 582.

With reference to block 512 (current document signature being found), this means that the current document is exactly the same as the matching authoritative document. In this case, the verification engine sets authenticity information relating to the current document to contain an indication that the current document is authentic (for example, by adding the name of the corresponding authoritative source and the link in the authoritative datastore to the matching authoritative document). The process then continues to block 582.

With reference instead to block 514 (current document signature not being found), this means that the current document is not exactly the same as any authoritative document. In this case, the verification engine splits the current documents into its current segments being defined as above (by any multimedia contents and text portions). A loop is then entered for generating the current segment signatures. The loop begins at block 516, wherein the verification engine takes a (present) current segment into account (starting from a first one in any arbitrary order). The verification engine at block 518 commands the hash generator to generate the hash value of the current segment defining its current segment signature as above (from its binary representation for a multimedia content or from its conversion into the standard format for a text portion). The verification engine at block 520 verifies whether a last current segment has been processed. If not, the flow of activity returns to block 516 to repeat the same operations on a next current segment. Conversely (once all the current segments have been processed), the loop is exited by descending into block 522. At this point, the verification engine searches (via the browser) the current segment signatures in the blockchain; the search is performed moving backwards from the end of the blockchain until all the current segment signatures have been found or the start of the blockchain has been reached. The flow of activity branches at block 524 according to a result of this (segment) search.

If one or more transactions are found relating to corresponding (matching) authoritative documents having their authoritative segment signatures containing (as a whole) all the current document signatures, this means that the current document has been composed from these matching authoritative documents. In this case, the flow of activity further branches at block 526 according to a number of the matching authoritative documents. If the current segment signatures have been found within the authoritative segment signatures of a single matching authoritative document, the verification engine at block 528 adds an indication to the authenticity information (initially empty) that the current document is a derivation thereof (for example, by adding the link in the authoritative datastore to the matching authoritative document and the name of the corresponding authoritative source). The verification engine at block 530 compares an order of the current segment signatures with an order of the authoritative segment signatures of the matching authoritative document. The flow of activity branches at block 532 according to a result of this (order) comparison. If the order is not the same, the verification engine at block 534 adds an indication to the authenticity information that the current document is a rearrangement of the matching authoritative document (for example, by adding the link in the authoritative datastore to the corresponding authoritative segment for each (moved) current segment being moved with respect to a position of the authoritative segment in the matching authoritative document).

The process then descends into block 536; the same point is also reached directly from block 534 if the order has not been changed. At this point, the verification engine compares a number of the current segment signatures with a number of the authoritative segment signatures of the matching authoritative document. The flow of activity branches at block 538 according to a result of this (number) comparison. If the numbers are not the same, this means that some authoritative segments of the matching authoritative document have been deleted in the current document. In this case, the verification engine at block 540 adds an indication to the authenticity information that the current document is a limitation, possibly in addition to a rearrangement, of the matching authoritative document (for example, by adding a placeholder with the link in the authoritative datastore to each (deleted) authoritative segment of the matching authoritative document that has been deleted in the current document). The process then descends into block 582 from block 540 or directly from block 538 if the number of the current segment signatures is the same as the number of the authoritative segment signatures of the matching authoritative document.

Referring back to block 526, if the current segment signatures have been found within the authoritative segment signatures of multiple matching authoritative document, this means that the current document is a mixture thereof. In this case, the verification engine at block 542 compares the maximum (matching segment) number of the current segment signatures that have been found in each of the matching authoritative documents with a (segment) threshold, for example, 50-80% of the number of the current segment signatures. If the maximum matching segment number is (possibly strictly) higher than the segment threshold, the verification engine at block 544 sets the authenticity information to contain an indication that the current document is a mixture of the (main) matching authoritative document containing the maximum matching segment number of the current segment signatures with the other (secondary) matching authoritative documents (for example, by adding the links in the authoritative datastore to the main matching authoritative document, to each secondary matching authoritative document and to the corresponding authoritative segment of each current segment). Conversely, if none of the numbers of the current segment signatures that have been found in the matching authoritative documents reaches the segment threshold, the verification engine at block 546 sets the authenticity information to contain an indication that the current document is a mixture of the (peer) matching authoritative documents (for example, by adding the links in the authoritative datastore to the matching authoritative documents and to the corresponding authoritative segment of each current segment). The process then descends into block 582 from either block 544 or block 546.

Referring back to block 524, if one or more current document signatures have not been found in the blockchain, this means that the corresponding (updated) current segments are an update (i.e., addition or change) with respect to possible one or more authoritative documents having their authoritative segment signatures containing part of the current document signatures. In this case, the verification engine at block 548 compares a maximum (matching segment) number of the current segment signatures that have been found in each of the authoritative documents (if any) with a (segment) threshold, for example, 50-80% of the number of the current segment signatures. If the maximum matching segment number is (possibly strictly) higher than the segment threshold, the verification engine at block 550 adds an indication to the authenticity information (initially empty) that the current document is a manipulation of the (origin) authoritative document containing the maximum matching segment number of the current segment signatures (for example, by adding the link in the authoritative datastore to the origin authoritative document).

The verification engine at block 552 commands the sentiment analyzer to determine any authoritative sentiment indicators being expressed by the origin authoritative document. A loop is then entered for determining possible sentiments injected into the current document. The loop begins at block 554, wherein the verification engine takes a (present) updated current segment into account (starting from a first one in any arbitrary order). The verification engine at block 556 commands the sentiment analyzer to determine any current sentiment indicators being expressed by the updated current segment. The verification engine at block 558 compares the current sentiment indicators (of the updated current segment) with the authoritative sentiment indicators (of the origin authoritative document). The flow of activity branches at block 560 according to a result of this (sentiment) comparison. If one or more (new) sentiment indicators of the current segment indicators are different from the authoritative sentiment indicators (always true when no authoritative sentiment indicator has been found), this means that a corresponding personal opinion has been injected into the current document; a typical example is when the origin authoritative document is objective whereas the updated current segment is significantly biased (subjective, positive/negative polarity or beyond polarity).

In this case, the verification engine at block 562 adds the new sentiment indicators to the authentication information, if necessary (for example, by adding the link to the updated current segment in association with the new sentiment indicators). The process then descends into block 564; the same point is also reached directly from block 560 when no current sentiment indicator is different from the authoritative sentiment indicators (always true when no current sentiment indicator has been found). At this point, the certification engine verifies whether a last updated current segment has been processed. If not, the flow of activity returns to block 554 to repeat the same operations on a next updated current segment. Conversely (once all the updated current segments have been processed), the loop is exited by descending into block 582.

Referring back to block 548, if none of the numbers of the current segment signatures that have been found in the authoritative documents reaches the segment threshold (always true when all the current segment signatures have not been found in the blockchain), the verification engine at block 566 commands the cognitive engine to extracts the current feature labels from the current document. The verification engine at block 568 commands the hash generator to generates the hash values of the list of the current feature labels defining its current feature signature. The verification engine at block 570 searches (via the browser) the current feature signature in the blockchain; the search is performed moving backwards from the end of blockchain until the start of the blockchain has been reached (or a maximum number of hits has been reached, such as 10-100). The flow of activity branches at block 572 according to a result of this (feature) search. If one or more transactions are found relating to corresponding (reference) authoritative documents having their authoritative feature signatures equal to the current feature signature, the process descends into block 574 (meaning that the current document takes inspiration from the reference authoritative documents). Conversely, the verification engine at block 576 searches (via the browser) the current feature labels in the blockchain; the search is performed moving backwards from the end of blockchain until the start of the blockchain has been reached (or a maximum number of hits has been reached, such as 10-100).

The verification engine at block 578 compares the maximum (matching feature) number of the current feature labels that have been found in each of the authoritative documents with a (feature) threshold, for example, 50-80% of the number of the current feature labels. If the maximum matching feature number is (possibly strictly) higher than the feature threshold, the process descends into block 574 as well (meaning that the current document takes inspiration from one or more (reference) authoritative documents containing the maximum matching feature number of the current feature labels). With reference now to block 574, the verification engine sets the authenticity information to contain an indication that the current document takes inspiration from the reference authoritative documents (for example, by adding the link in the authoritative datastore to the reference authoritative documents and their authoritative feature labels equal to the current feature labels). The process then continues to block 582. Returning to block 578, if none of the numbers of the current feature labels that have been found in the authoritative documents reaches the feature threshold (always true when no current feature label has been found in the current document or in the blockchain), the verification engine at block 580 sets the authenticity information to contain an indication that the current document may not be authenticated and then it is likely to be fake. The process then continues to block 582.

With reference now to block 582, the verification engine commands the bowser to output an indication of the authentication information. For example, the browser opens a pop-up window displaying whether the current document is the same as a matching authoritative document, derives from a matching authoritative document (being rearranged and/or limited), is a mixture of multiple authoritative documents (main/secondary ones or peer ones), is a manipulation of an origin authoritative document, takes inspiration from reference authoritative documents or it is likely to be fake. Moreover, when the current document derives from a matching authoritative document the current segments that have been moved may be highlighted and/or placeholders for the authoritative segments that have been deleted may be shown, when the current document is a mixture of multiple authoritative document the corresponding segments may be differentiated visually, when the current document is a manipulation of an origin authoritative document its updated current segments may be highlighted, or when the current document takes inspiration from reference authoritative documents its current segments with the same key features may be highlighted. The process then returns to block 502 waiting for the downloading of a next current document.

Naturally, to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities).

In various embodiments, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence, or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for verifying authenticity of documents. However, the documents may be of any type (for example, files, web pages, compressed archives and so on) and with any content (for example, relating to any topic, in any form, such as text, images, videos, audios and so on); moreover, their authenticity may be verified in any way (for example, automatically, always or only for current documents downloaded from web sites not comprised in a white list, upon request and so on) and for any purpose (for example, to identify fake news, detect copyright violations, rate the documents and so on).

In an embodiment, the method comprises the following steps under the control of a computing system. However, the computing system may be of any type (see below).

In an embodiment, the method comprises receiving (by the computing system) a current document. However, the current document may be received in any way (for example, downloaded from any network, copied from any removable memory device, stand-alone or extracted from any memory structure, in push or pull mode, in any social network, while surfing the Internet and so on).

In an embodiment, the method comprises splitting (by the computing system) the current document into a plurality of current segments. However, the current segments may be in any number and defined in any way (for example, by partial, different and additional pieces of information with respect to the ones mentioned above).

In an embodiment, the method comprises calculating (by the computing system) corresponding current segment signatures representative of the current segments. However, the current segment signatures may be of any type (for example, hash values, checksums and so on).

In an embodiment, the method comprises performing (by the computing system) a segment search of the current segment signatures in an authoritative memory structure. However, the authoritative memory structure may be of any type (for example, distributed/centralized such as a blockchain, a private database and so on) and it may be searched in any way (for example, by accessing it directly, by submitting a corresponding command to a manager thereof and so on).

In an embodiment, the authoritative memory structure contains corresponding authoritative segment signatures representative of a plurality of authoritative segments of each of a plurality of authoritative documents. However, the authoritative documents may be in any number, each of them with authoritative segment signatures of its authoritative segments defined in the same way as for the current document; moreover, for each authoritative document the authoritative memory structure may contain any additional information, down to none (for example, links to the authoritative document/segments, the authoritative document itself, any identification of its authoritative source, a date of publication, the author(s) of the authoritative document and so on).

In an embodiment, the content of the authoritative documents is certified by one or more authoritative sources. However, the authoritative sources may be in any number and of any type (for example, partial, different and additional authoritative sources with respect to the ones mentioned above); the authoritative sources may certify the content of the authoritative documents in any way (for example, by the fact that they are authorized to write the authoritative memory structure by a control authority being generally trusted, by their identities verifiable via corresponding digital certificates, by their digital signatures of the authoritative documents and so on).

In an embodiment, the method comprises determining (by the computing system) authenticity information indicative of authenticity of a content of the current document according to a result of the segment search. However, the authenticity information may be of any type (for example, containing partial, different and additional pieces of information with respect to the ones mentioned above).

In an embodiment, the method comprises outputting (by the computing system) an indication of the authenticity information. However, the indication of the authenticity information may be output in any way (for example, displayed, uttered, transmitted remotely and so on).

Further embodiments provide additional advantageous features, which may however be omitted at all in a basic implementation.

Particularly, in an embodiment the method comprises calculating (by the computing system) a current document signature representative of the current document. However, the current document signature may be calculated in any way (for example, either the same or different with respect to the current/authoritative segment signatures).

In an embodiment, the method comprises performing (by the computing system) a document search of the current document signature in the authoritative memory structure further containing corresponding authoritative document signatures representative of the authoritative documents. However, the authoritative document signatures may be defined in any way (the same as for the current document signature).

In an embodiment, the method comprises conditioning (by the computing system) the segment search on a negative result of the document search. However, the possibility is not excluded of using the current/authoritative segment signatures only (with the current document that is determined to be equal to a (matching) authoritative document when the current segment signatures are the same (number and order) as the authoritative segment signatures of the matching authoritative document).

In an embodiment, the method comprises determining (by the computing system) the authenticity information to contain an indication of a derivation of the current document from a matching one of the authoritative documents in response to the matching authoritative document having the authoritative segment signatures containing all the current segment signatures but the authoritative document signature different from the current document signature. However, in this case the authenticity information may be of any type (for example, indicating that the current document is a derivation, with a link to the matching authoritative document and so on). In any case, the possibility is not excluded of reaching the same conclusion using the current/authoritative segment signatures only (when the authoritative segments of the matching authoritative document contain all the current segments signatures but they are in different order and/or number).

In an embodiment, the method comprises determining (by the computing system) the authenticity information to contain an indication of a rearrangement of the current document with respect to a matching one of the authoritative documents in response to the matching authoritative document having the authoritative segment signatures containing all the current segment signatures but with an order of the current segment signatures being different from an order of the authoritative segment signatures of the matching authoritative document. However, in this case the authenticity information may be of any type (for example, indicating that the current document is a rearrangement, highlighting the moved current segments in any way, with pointers to the corresponding positions of the moved current segments in the matching authoritative document, with a link to the matching authoritative document, with links to the authoritative segments in the matching authoritative document corresponding to the moved current segments and so on).

In an embodiment, the method comprises determining (by the computing system) the authenticity information to contain an indication of a limitation of the current document with respect to a matching one of the authoritative documents in response to the matching authoritative document having the authoritative segment signatures containing all the current segment signatures but with a number of the current segment signatures being lower than a number of the authoritative segment signatures of the matching authoritative document. However, in this case the authenticity information may be of any type (for example, indicating that the current document is a limitation, adding any placeholders in the current document for the deleted authoritative segments of the matching authoritative document, with a link to the matching authoritative document, with links to the deleted authoritative segments at their placeholders and so on).

In an embodiment, the method comprises determining (by the computing system) the authenticity information to contain an indication of a mixture of the current document from a plurality of matching ones of the authoritative documents in response to the current segment signatures being comprised in the authoritative segment signatures of the matching authoritative documents each comprising a corresponding part thereof. However, in this case the authenticity information may be of any type (for example, indicating that the current document is a mixture, differentiating the current segments being found in the different matching authoritative documents in any way, such as by different colors, tags and the like, with links to the matching authoritative documents, with links to the authoritative segments corresponding to the current segments and so on).

In an embodiment, the method comprises determining (by the computing system) the authenticity information to contain an indication of the mixture of the current document from a main matching authoritative document and one or more secondary marching authoritative documents of the matching authoritative documents in response to the current segment signatures being comprised in the authoritative segment signatures of the main matching authoritative document reaching a segment threshold. However, the segment threshold may have any value (for example, defined by the number and/or the length of the current/authoritative segments, expressed as a percentage of the number/length of the current segments, as an absolute value and so on); in this case, the authenticity information may be of any type (for example, indicating that the current document is a mixture based on the main matching authoritative document, highlighting the current segments being found in the main matching authoritative document, with links to the matching authoritative documents, with links to the authoritative segments corresponding to the current segments and so on).

In an embodiment, the method comprises determining (by the computing system) the authenticity information to contain an indication of a manipulation of the current document with respect to an origin one of the authoritative documents in response to a part of the current segment signatures being comprised in the authoritative segment signatures of the origin authoritative document reaching a segment threshold and other one or more of the current segment signatures being not found in the authoritative memory structure. However, the segment threshold may have any value (for example, either the same or different with respect to above); in this case, the authenticity information may be of any type (for example, indicating that the current document is a manipulation, highlighting the current segments being not found in the authoritative memory structure, with a link to the origin authoritative document, with links to the authoritative segments of the origin authoritative document corresponding to the current segments and so on).

In an embodiment, the method comprises performing (by the computing system) a sentiment analysis of each updated one of the current segments whose current segment signature has not been found in the authoritative memory structure to determine any current sentiment indicators of corresponding sentiments expressed by the updated current segment. However, the sentiment analysis may be performed in any way (for example, with knowledge-based, statistical or hybrid approaches) for determining any number and type of current sentiment indicators (for example, partial, different and additional sentiment indicators with respect to the ones mentioned above).

In an embodiment, the method comprises comparing (by the computing system) the current sentiment indicators of each updated current segment with any authoritative sentiment indicators of corresponding sentiments expressed by the origin authoritative document to determine any new sentiment indicators of corresponding sentiments being injected into the current document with respect to the origin authoritative document. However, the authoritative sentiment indicators may be retrieved in any way (for example, downloaded from the authoritative memory structure, determined from the origin authoritative document as above as so on) and the new sentiment indicators may be determined in any way (for example, each current sentiment indicator different from the authoritative sentiment indicators, each current sentiment indicator different from the authoritative sentiment indicators in a minimum number of and/or with a minimum reliability index in the updated current segments, and so on).

In an embodiment, the method comprises determining (by the computing system) the authenticity information to contain an indication of the new sentiment indicators. However, in this case the authenticity information may be of any type (for example, indicating the new sentiment indicators, highlighting the updated current segments providing the new sentiment indicators, indicating the new sentiment indicators being provided by each updated current segment, with a link to the origin authoritative document, with links to the authoritative segments of the origin authoritative document corresponding to the current segments and so on).

In an embodiment, the method comprises retrieving (by the computing system) the authoritative sentiment indicators of the origin authoritative document from the authoritative memory structure further containing any authoritative sentiment indicators of corresponding sentiments expressed by each of the authoritative documents. However, the authoritative sentiment indicators of each authoritative document may be in any number and of any type (as the current sentiment indicators).

In an embodiment, the method comprises the following steps in response to a negative result of the segment search due to the current segment signatures being not found in the authoritative segment signatures of any of the authoritative documents reaching a segment threshold. However, the negative result of the segment search may be defined in any way (for example, when the current segment signatures are not found reaching any segment threshold, either the same or different with respect to above, individually in each authoritative document, cumulatively in the whole authoritative memory structure and so on).

In an embodiment, in response to the negative result of the segment search the method comprises extracting (by the computing system) one or more current feature labels from the current document indicative of corresponding key features of the content thereof. However, the current feature labels may be extracted in any way (for example, by applying any cognitive technique, from titles/subtitles, from an abstract and so on); the current feature labels may be in any number and of any type (for example, indicative of partial, different and additional key features with respect to the ones mentioned above).

In an embodiment, in response to the negative result of the segment search the method comprises performing (by the computing system) a feature search of the current feature labels in the authoritative memory structure further containing one or more authoritative feature labels indicative of corresponding key features of each of the authoritative documents. However, the authoritative feature labels may be defined in any way (the same as for the current feature labels); moreover, the current feature labels may be searched in any way (for example, by using the current/authoritative feature signatures, the current/authoritative feature labels in addition or in alternative thereto, so on).

In an embodiment, in response to the negative result of the segment search the method comprises determining (by the computing system) the authenticity information according to a result of the feature search. However, in this case the authenticity information may be of any type (for example, always indicating the current feature labels being found in the authoritative memory structure or only when they reach the feature threshold, highlighting the current segments providing the current feature labels being found and so on).

In an embodiment, in response to the negative result of the segment search the method comprises determining (by the computing system) the authenticity information to contain an indication of an inspiration of the current document on one or more reference authoritative documents of the authoritative documents in response to the current feature labels being comprised in the authoritative feature labels of each of the reference authoritative documents reaching a feature threshold. However, the feature threshold may have any value (for example, defined by the numbers and/or reliability indexes of the current/authoritative feature labels, expressed as a percentage of the number/reliability indexes of the current feature labels, as an absolute value and so on) and they may have been found in any number of reference authoritative documents (all the possible ones, all the best ones, the possible/best ones limited to any maximum number and so); in this case, the authenticity information may be of any type (for example, indicating that the current document takes inspiration from the reference authoritative documents, highlighting the current segments providing the current feature labels being found in the reference authoritative documents, with links to the reference authoritative documents, with links to the authoritative segments of the reference authoritative documents providing the current feature labels and so on).

In an embodiment, the authoritative memory structure is a blockchain whose validators authorized to write the blockchain are the authoritative sources. However, the blockchain may be of any type (for example, based on any consensus algorithm, permissioned with the authoritative sources that are authorized to write it either directly or indirectly, permissionless when the authoritative sources that are trusted independently from it, and so on).

In an embodiment, said receiving the current document comprises downloading (by the computing system) the current document from a global network. However, the global network may be of any type (for example, the web, the Internet in general and so on) and the current documents may be downloaded in any way (for example, with a browser, an app and the like, with the current document that is simply opened or saved in the computing system, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the method of above when the computer program is executed on the computing system. An embodiment provides a computer program product that comprises one or more computer readable storage media having program instructions collectively stored in said one or more computer readable storage media, the program instructions readable by the computing system to cause the computing system to perform the same method. However, the program may be implemented as a stand-alone module, as a plug-in for a pre-existing program (for example, the browser) or even directly in the latter; moreover, the program may take any form suitable to be used by any computing system (see below).

An embodiment provides a system comprising means that are configured for performing the steps of the above-described method. An embodiment provides a system comprising a circuitry (i.e., any hardware suitably configured, for example, by software) for performing each step of the same method. However, the system may be of any type (for example, a personal computer, a tablet, a smartphone and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for verifying authenticity of documents, wherein the method comprises, under control of a computing system:

receiving, by the computing system, a current document, splitting, by the computing system, the current document into a plurality of current segments, calculating, by the computing system, corresponding current segment signatures representative of the current segments, performing, by the computing system, a segment search of the current segment signatures in an authoritative memory structure containing corresponding authoritative segment signatures representative of a plurality of authoritative segments of each of a plurality of authoritative documents whose content is certified by one or more authoritative sources, responsive to the current segment signatures being found within the plurality of authoritative segment signatures of multiple matching authoritative document, comparing a maximum matching segment number of the current segment signatures that have been found in each of the matching authoritative documents with a segment threshold, wherein responsive to the numbers of the current segment signatures, that have been found in the matching authoritative documents, failing to reach the segment threshold, setting an authenticity information to contain an indication that the current document is a mixture of peer matching authoritative documents, determining, by the computing system, authenticity information indicative of authenticity of a content of the current document according to a result of the segment search, and outputting, by the computing system, an indication of the authenticity information.

2. The method according to claim 1, wherein the method comprises:
calculating, by the computing system, a current document signature representative of the current document,
performing, by the computing system, a document search of the current document signature in the authoritative memory structure further containing corresponding authoritative document signatures representative of the authoritative documents, and
conditioning, by the computing system, the segment search on a negative result of the document search.

3. The method according to claim 2, wherein the method comprises:
determining, by the computing system, the authenticity information to contain an indication of a derivation of the current document from a matching one of the authoritative documents in response to the matching authoritative document having the authoritative segment signatures containing all the current segment signatures but the authoritative document signature different from the current document signature.

4. The method according to claim 1, wherein the method comprises:
determining, by the computing system, the authenticity information to contain an indication of a rearrangement of the current document with respect to a matching one of the authoritative documents in response to the matching authoritative document having the authoritative segment signatures containing all the current segment signatures but with an order of the current segment signatures being different from an order of the authoritative segment signatures of the matching authoritative document.

5. The method according to claim 1, wherein the method comprises:
determining, by the computing system, the authenticity information to contain an indication of a limitation of the current document with respect to a matching one of the authoritative documents in response to the matching authoritative document having the authoritative segment signatures containing all the current segment signatures but with a number of the current segment signatures being lower than a number of the authoritative segment signatures of the matching authoritative document.

6. The method according to claim 1, wherein the method comprises:
determining, by the computing system, the authenticity information to contain an indication of a mixture of the current document from a plurality of matching ones of the authoritative documents in response to the current segment signatures being comprised in the authoritative segment signatures of a matching authoritative documents each comprising a corresponding part thereof.

7. The method according to claim 6, wherein the method comprises:
determining, by the computing system, the authenticity information to contain an indication of the mixture of the current document from a main matching authoritative document and one or more secondary matching authoritative documents of the matching authoritative documents in response to the current segment signatures being comprised in the authoritative segment signatures of the main matching authoritative document reaching a segment threshold.

8. The method according to claim 1, wherein the method comprises:
determining, by the computing system, the authenticity information to contain an indication of a manipulation of the current document with respect to an origin one of the authoritative documents in response to a part of the current segment signatures being comprised in the authoritative segment signatures of the origin authoritative document reaching a segment threshold and other one or more of the current segment signatures being not found in the authoritative memory structure.

9. The method according to claim 8, wherein the method comprises:
performing, by the computing system, a sentiment analysis of each updated one of the current segments whose current segment signature has not been found in the authoritative memory structure to determine any current sentiment indicators of corresponding sentiments expressed by the updated current segment,
comparing, by the computing system, the current sentiment indicators of each updated current segment with any authoritative sentiment indicators of corresponding sentiments expressed by the origin authoritative document to determine any new sentiment indicators of corresponding sentiments being injected into the current document with respect to the origin authoritative document, and
determining, by the computing system, the authenticity information to contain an indication of the new sentiment indicators.

10. The method according to claim 9, wherein the method comprises:
retrieving, by the computing system, the authoritative sentiment indicators of the origin authoritative document from the authoritative memory structure further containing any authoritative sentiment indicators of corresponding sentiments expressed by each of the authoritative documents.

11. The method according to claim 1, wherein the method comprises, in response to a negative result of the segment search due to the current segment signatures being not found in the authoritative segment signatures of any of the authoritative documents reaching a segment threshold:
extracting, by the computing system, one or more current feature labels from the current document indicative of corresponding key features of the content thereof,
performing, by the computing system, a feature search of the current feature labels in the authoritative memory structure further containing one or more authoritative feature labels indicative of corresponding key features of each of the authoritative documents, and
determining, by the computing system, the authenticity information according to a result of the feature search.

12. The method according to claim 11, wherein the method comprises, in response to the negative result of the segment search:
determining, by the computing system, the authenticity information to contain an indication of an inspiration of the current document on one or more reference authoritative documents of the authoritative documents in response to the current feature labels being comprised in the authoritative feature labels of each the reference authoritative documents reaching a feature threshold.

13. The method according to claim 1, wherein the authoritative memory structure is a blockchain whose validators authorized to write the blockchain are the authoritative sources, wherein each transaction on the blockchain contains a link to the corresponding authoritative document, a name of its authoritative source, an authoritative document signature of the whole authoritative document, corresponding links to authoritative segments splitting the authoritative document, corresponding authoritative segment signatures of the authoritative segments, a list of authoritative feature labels of the authoritative document and an authoritative feature signature of the list of authoritative feature labels.

14. The method according to claim 1, wherein said receiving the current document comprises:
   downloading, by the computing system, the current document from a global network.

15. A computer program product for verifying authenticity of documents, the computer program product comprising one or more computer readable storage media having program instructions collectively stored in said one or more computer readable storage media, the program instructions readable by a computing system to cause the computing system to perform a method comprising:
   receiving a current document,
   splitting the current document into a plurality of current segments,
   calculating corresponding current segment signatures representative of the current segments,
   performing a segment search of the current segment signatures in an authoritative memory structure containing corresponding authoritative segment signatures representative of a plurality of authoritative segments of each of a plurality of authoritative documents whose content is certified by one or more authoritative sources,
   responsive to the current segment signatures being found within the plurality of authoritative segment signatures of multiple matching authoritative document, comparing a maximum matching segment number of the current segment signatures that have been found in each of the matching authoritative documents with a segment threshold, wherein responsive to the numbers of the current segment signatures, that have been found in the matching authoritative documents, failing to reach the segment threshold, setting an authenticity information to contain an indication that the current document is a mixture of peer matching authoritative documents,
   determining authenticity information indicative of authenticity of a content of the current document according to a result of the segment search, and
   outputting an indication of the authenticity information.

16. A system for verifying authenticity of documents, wherein the system comprises:
   a circuitry for receiving a current document,
   a circuitry for splitting the current document into a plurality of current segments,
   a circuitry for calculating corresponding current segment signatures representative of the current segments,
   a circuitry for performing a segment search of the current segment signatures in an authoritative memory structure containing corresponding authoritative segment signatures representative of a plurality of authoritative segments of each of a plurality of authoritative documents whose content is certified by one or more authoritative sources,
   responsive to the current segment signatures being found within the plurality of authoritative segment signatures of multiple matching authoritative document, a circuitry for comparing a maximum matching segment number of the current segment signatures that have been found in each of the matching authoritative documents with a segment threshold, wherein responsive to the numbers of the current segment signatures, that have been found in the matching authoritative documents, failing to reach the segment threshold, setting an authenticity information to contain an indication that the current document is a mixture of peer matching authoritative documents,
   a circuitry for determining authenticity information indicative of authenticity of a content of the current document according to a result of the segment search, and
   a circuitry for outputting an indication of the authenticity information.

17. The system according to claim 16, wherein the system comprises:
   a circuitry for calculating a current document signature representative of the current document,
   a circuitry for perform a document search of the current document signature in the authoritative memory structure further containing corresponding authoritative document signatures representative of the authoritative documents, and
   a circuitry for conditioning the segment search on a negative result of the document search.

18. The system according to claim 17, wherein the system comprises:
   a circuitry for determine the authenticity information to contain an indication of a derivation of the current document from a matching one of the authoritative documents in response to the matching authoritative document having the authoritative segment signatures containing all the current segment signatures but the authoritative document signature different from the current document signature.

19. The system according to claim 16, wherein the system comprises:
   a circuitry for determining the authenticity information to contain an indication of a rearrangement of the current document with respect to a matching one of the authoritative documents in response to the matching authoritative document having the authoritative segment signatures containing all the current segment signatures but with an order of the current segment signatures being different from an order of the authoritative segment signatures of the matching authoritative document.

20. The system according to claim 16, wherein the system comprises:
   a circuitry for determining the authenticity information to contain an indication of a limitation of the current document with respect to a matching one of the authoritative documents in response to the matching authoritative document having the authoritative segment signatures containing all the current segment signatures but with a number of the current segment signatures being lower than a number of the authoritative segment signatures of the matching authoritative document.

* * * * *